US011563724B1

United States Patent
Zubovsky

(10) Patent No.: US 11,563,724 B1
(45) Date of Patent: *Jan. 24, 2023

(54) SYSTEM AND METHOD FOR ALLOWING ACCESS TO AN APPLICATION OR FEATURES THEREOF ON EACH OF ONE OR MORE USER DEVICES

(71) Applicant: Charles Schwab & Co., Inc., San Francisco, CA (US)

(72) Inventor: Valery Zubovsky, San Francisco, CA (US)

(73) Assignee: Charles Schwab & Co., Inc., Southlake, TX (US)

( * ) Notice: Subject to any disclaimer, the term of this patent is extended or adjusted under 35 U.S.C. 154(b) by 85 days.

This patent is subject to a terminal disclaimer.

(21) Appl. No.: 17/136,792

(22) Filed: Dec. 29, 2020

Related U.S. Application Data

(63) Continuation of application No. 16/512,294, filed on Jul. 15, 2019, now Pat. No. 10,880,276, which is a continuation of application No. 14/968,593, filed on Dec. 14, 2015, now Pat. No. 10,356,053.

(60) Provisional application No. 62/091,436, filed on Dec. 12, 2014.

(51) Int. Cl.
*H04L 9/40* (2022.01)
(52) U.S. Cl.
CPC ........ *H04L 63/0428* (2013.01); *H04L 63/083* (2013.01); *H04L 63/0876* (2013.01)
(58) Field of Classification Search
CPC .................. G06F 21/33; G06F 21/6218; G06F 2221/0737; G06F 2221/2137; H04L 63/04; H04L 63/0823; H04L 63/126; H04L 63/083; H04L 2463/082; H04L 9/3226; H04W 12/06; H04W 12/08
See application file for complete search history.

(56) References Cited

U.S. PATENT DOCUMENTS

| | | | |
|---|---|---|---|
| 5,719,941 A * | 2/1998 | Swift ...................... | G06F 21/31 705/72 |
| 8,627,422 B2 * | 1/2014 | Hawkes .............. | H04L 63/0869 380/255 |
| 9,858,781 B1 * | 1/2018 | Campero .............. | H04L 9/3242 |
| 10,356,053 B1 * | 7/2019 | Zubovsky ........... | H04L 63/0876 |
| 10,536,436 B1 * | 1/2020 | Barbour .............. | H04L 63/0838 |
| 11,323,434 B1 * | 5/2022 | Vali ...................... | H04L 63/102 |
| 2003/0028664 A1 * | 2/2003 | Tan ...................... | G06F 21/6218 709/229 |
| 2004/0230657 A1 * | 11/2004 | Tomkow ................. | H04L 51/23 709/206 |
| 2004/0230800 A1 * | 11/2004 | Futa ........................ | G06F 21/32 713/169 |

(Continued)

*Primary Examiner* — Lizbeth Torres-Diaz
(74) *Attorney, Agent, or Firm* — Innovation Partners LLC; Charles E. Gotlieb

(57) ABSTRACT

A system and method allows a user to register one or more PINs on one or more user devices, and then authenticates the user to a server via the PIN and a token deposited on the user device being used by the user to allow access to an application on the user device. Individual tokens, or all tokens deposited on the user devices for a user account, may be invalidated, and the user is prevented from authenticating himself or herself via a PIN to allow access to an application on any device for which the last token deposited was invalidated, until the same or different PIN is registered for that device.

12 Claims, 4 Drawing Sheets

(56) References Cited

U.S. PATENT DOCUMENTS

| | | | |
|---|---|---|---|
| 2005/0198511 A1* | 9/2005 | Tomkow | H04L 63/123 |
| | | | 713/176 |
| 2006/0165060 A1* | 7/2006 | Dua | G06K 7/10297 |
| | | | 705/76 |
| 2011/0167267 A1* | 7/2011 | Ganz | G06Q 30/0258 |
| | | | 713/168 |
| 2012/0081227 A1* | 4/2012 | Cahn | G08B 13/2414 |
| | | | 340/572.1 |
| 2012/0265694 A1* | 10/2012 | Tuchman | G06Q 10/02 |
| | | | 705/304 |
| 2013/0145172 A1* | 6/2013 | Shablygin | G06F 21/33 |
| | | | 713/185 |
| 2014/0006273 A1* | 1/2014 | Gopinath | G06Q 20/10 |
| | | | 705/40 |
| 2016/0269403 A1* | 9/2016 | Koutenaei | H04L 63/102 |
| 2016/0371476 A1* | 12/2016 | Turgeman | G06F 3/04842 |
| 2019/0347440 A1* | 11/2019 | Langley | H04L 63/1441 |
| 2020/0111102 A1* | 4/2020 | Vukich | G06Q 20/40145 |

\* cited by examiner

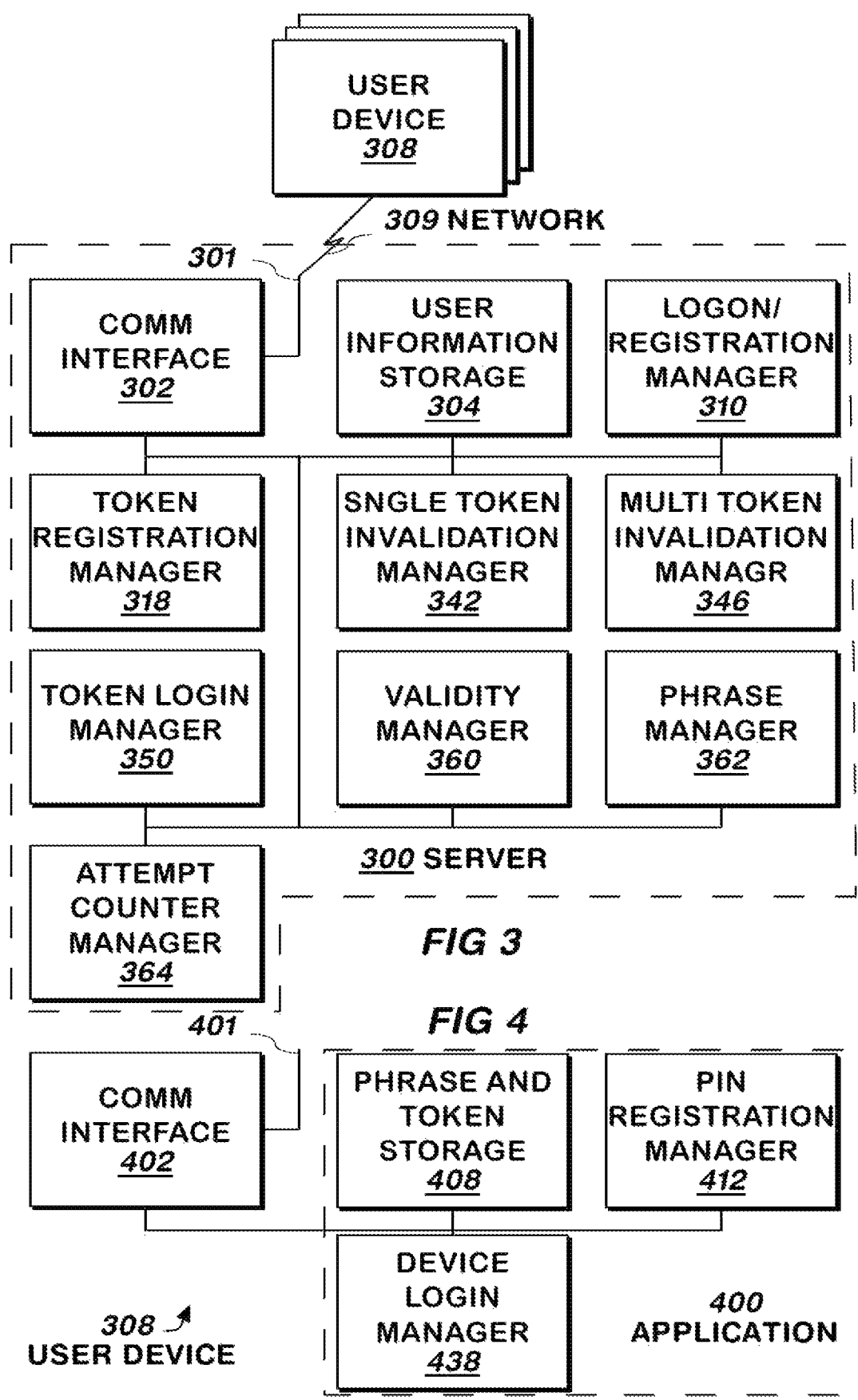

SYSTEM AND METHOD FOR ALLOWING ACCESS TO AN APPLICATION OR FEATURES THEREOF ON EACH OF ONE OR MORE USER DEVICES

RELATED APPLICATIONS

This application is a continuation of U.S. patent application Ser. No. 16/512,294 entitled, "System and Method for Allowing Access to an Application or Features Thereof On Each of One or More User Devices" filed by Valery Zubovsky on Jul. 15, 2019, issued as U.S. Pat. No. 10,890,276 on Dec. 29, 2020, which is a continuation of U.S. patent application Ser. No. 14/968,593 entitled, "System and Method for Allowing Access to an Application or Features Thereof On Each of One or More User Devices" filed by Valery Zubovsky on Dec. 14, 2015, which claims the benefit of U.S. Provisional Patent Application 62/091,436 entitled, "Method and Apparatus for Allowing Access to an Application or Features Thereof On Each of One or More User Devices" filed by Valery Zubovsky on Dec. 12, 2014, each having the same assignee as the present application and each is hereby incorporated by reference in its entirety.

FIELD OF THE INVENTION

The present invention is related to computer software and more specifically to computer software for accessing a server from a device such as a mobile device.

BACKGROUND OF THE INVENTION

Users can access features of an application using a user identifier and a password. Such an arrangement may not be optimal. What is needed is a system and method for accessing features of an application.

SUMMARY OF INVENTION

A system and method registers users for an account on a server using a user identifier and password. Users may operate an application in conjunction with the server from a user device from which they registered by entering only a short code, known as a PIN. The user registers with the server the user device on which the user would like to subsequently access an application using a PIN by entering their user identifier and password at the user device, which forwards it to the server, and, once such login information is authenticated by the server, the user enters the PIN for the user device being registered. The user device notifies the server, which generates a phrase, encrypts it, provides to the user device the encrypted phrase and a long-lived token, and stores a copy or identifier of the token on the server, associated with the account corresponding to the user identifier and password with which the user logged in. The server initializes an attempt counter to zero. The user device decrypts the phrase from the server, stores it and uses the PIN as a key to hash or otherwise encrypt the phrase, and the encrypted phrase is encrypted and provided to the server, which decrypts and stores on the server the phrase, as hashed or otherwise encrypted using the PIN. The PIN is not stored on the user device, nor is it provided to the server.

The user then uses an application on the device to enter their PIN to access functions provided by the application. The application allows the user to enter a PIN to log in if a token is stored on that user device, and the PIN is used to encrypt the phrase stored on the user device using the PIN the user entered. The application optionally re-encrypts the phrase, and sends the encrypted phrase to the server with the token. The server matches the token to the one stored and checks to determine if it has been marked invalid. If the token is invalid (either because it was marked invalid as described herein or cannot be located on the server), the server so indicates to the application, which may discard the token from the device.

If the token is valid, the server optionally decrypts the phrase (communications between the user device and the server may be encrypted using any conventional encryption technique, but such decryption is not performed using the PIN) and checks the phrase (encrypted with the PIN received from the user) against the phrase (encrypted with the PIN originally supplied by the user) stores at the server associated with the token. If the phrase received does not match the phrase stored, the server so indicates to the application on the user device and increments an attempt counter on the server, the application notified the user that the PIN is invalid, prompts the user for a PIN and the method repeats.

If the attempt counter is above the threshold, the server invalidates the token on the server and indicates to the application on the user device that the attempt counter is exceeded and the token should be discarded, and the application on the user device may discard the token and notify the user. The user would then need to fully authenticate himself or herself or register a new PIN (which could be the same as the former PIN) on the device as described herein to use the features that would not be provided unless the user authenticates himself or herself.

If the phrase received matches the phrase stored, the server resets the attempt counter, notifies the device, and the device allows access to functions on the device that would otherwise only be allowed if the user fully authenticated himself or herself to the server via a username and password, without such authentication information being received for the current session.

A unique identifier of the user device may be provided by the application to the server, and stored on the server when the token is registered as described above. The unique identifier may be provided by the application to the server with the token to be authenticated as described above, and used by the server to additionally validate the token.

Once the server validates the token and the phrase, the user can access the application, and can perform functions using the application that the user could not access if the token is not validated without providing a valid PIN or fully authenticating himself or herself using a username and password or other similar approach.

A token or all the tokens registered to an account can be invalidated on the server, based on an indication of any potential security breach (e.g. the user resets or changes his or her account password on the server, or a security breach is identified using other conventional techniques. The server will not validate an invalidated token as part of the authentication process following a PIN being supplied by the user, preventing access to the application on any device for which the token has been invalidated. In one embodiment, access to the functions of the application on one device of a user or all devices of a user for which the token or tokens have been invalidated may be provided using the user identifier and password of the account, unless the user reregisters a pin on any device for which the token was invalidated.

BRIEF DESCRIPTION OF THE DRAWINGS

FIG. 3 is a block schematic diagram of a system for providing access to functions performed by an application on a user device according to one embodiment of the present invention.

FIG. 4 is a block schematic diagram of a user device of FIG. 3 according to one embodiment of the present invention.

DETAILED DESCRIPTION OF A PREFERRED EMBODIMENT

Figure 1:
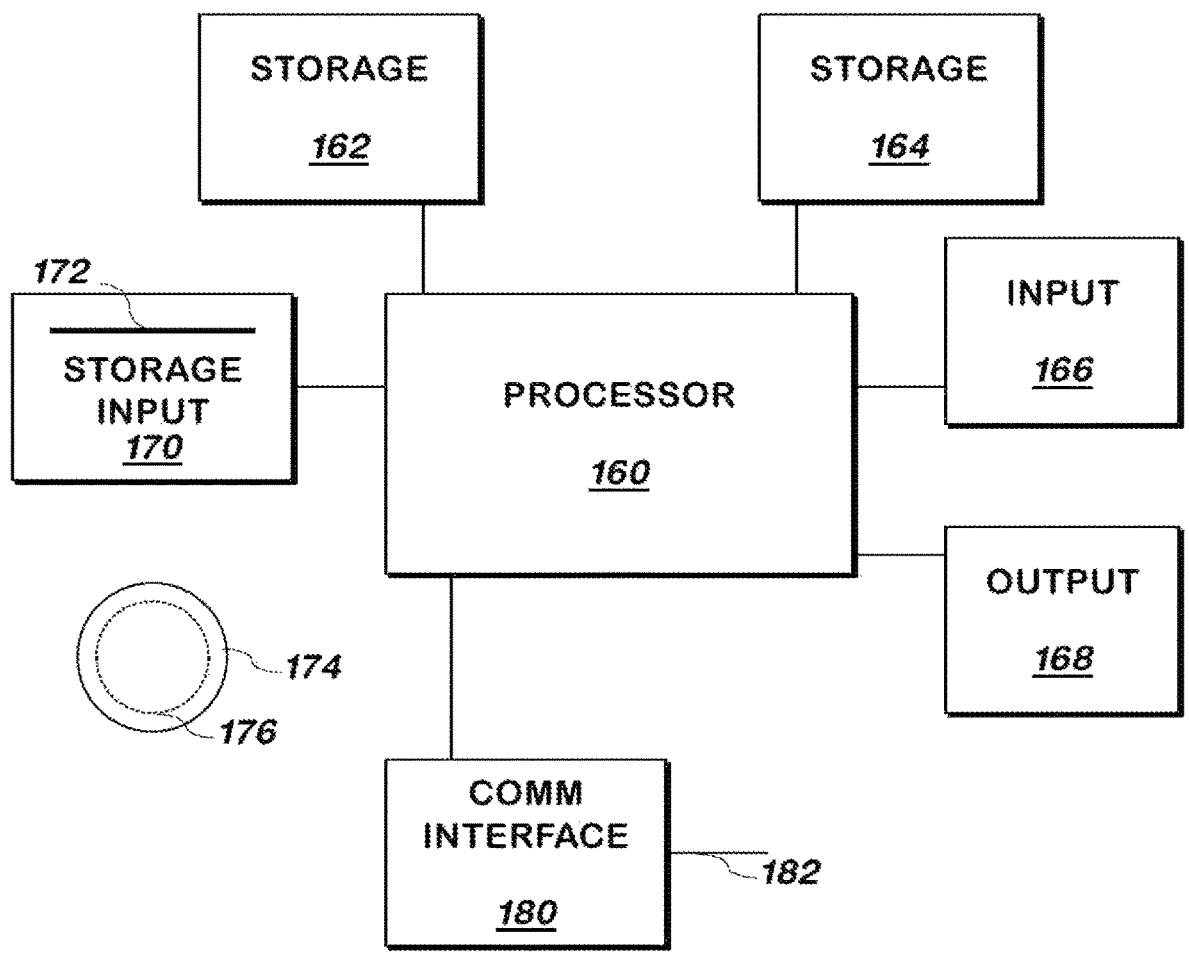
FIG. 1 is a block schematic diagram of a conventional computer system.

The present invention may be implemented as computer software or computer software running on a conventional computer system or hardware processor. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. All storage elements described herein nay include conventional memory and/or disk storage and may include a conventional database. All elements of a system include any or all of at least one input, at least one output and at least one input/output, and nay include a conventional hardware processor.

Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile or non-transitory storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS T SERIES SERVER running the SOLARIS operating system commercially available from ORACLE CORPORATION of Redwood Shores, Calif., a PENTIUM-compatible personal computer system such as are available from DELL COMPUTER CORPORATION of Round Rock, Tex. running a version of the WINDOWS operating system (such as XP, VISTA, or 7) commercially available from MICROSOFT Corporation of Redmond Wash. or a Macintosh computer system running the MACOS or OPENSTEP operating system commercially available from APPLE INCORPORATED of Cupertino, Calif. and the FIREFOX browser commercially available from MOZILLA FOUNDATION of Mountain View, Calif. or INTERNET EXPLORER browser commercially available from MICROSOFT above, although other systems may be used. Each computer system 150 may be a SAMSUNG GALAXY NEXUS III commercially available from SAMSUNG ELECTRONICS GLOBAL of Seoul, Korea running the ANDROID operating system commercially available from GOOGLE, INC. of Mountain View, Calif. Various computer systems may be employed, with the various computer systems communicating with one another via the Internet, a conventional cellular telephone network, an Ethernet network, or all of these.

Figure 2A:
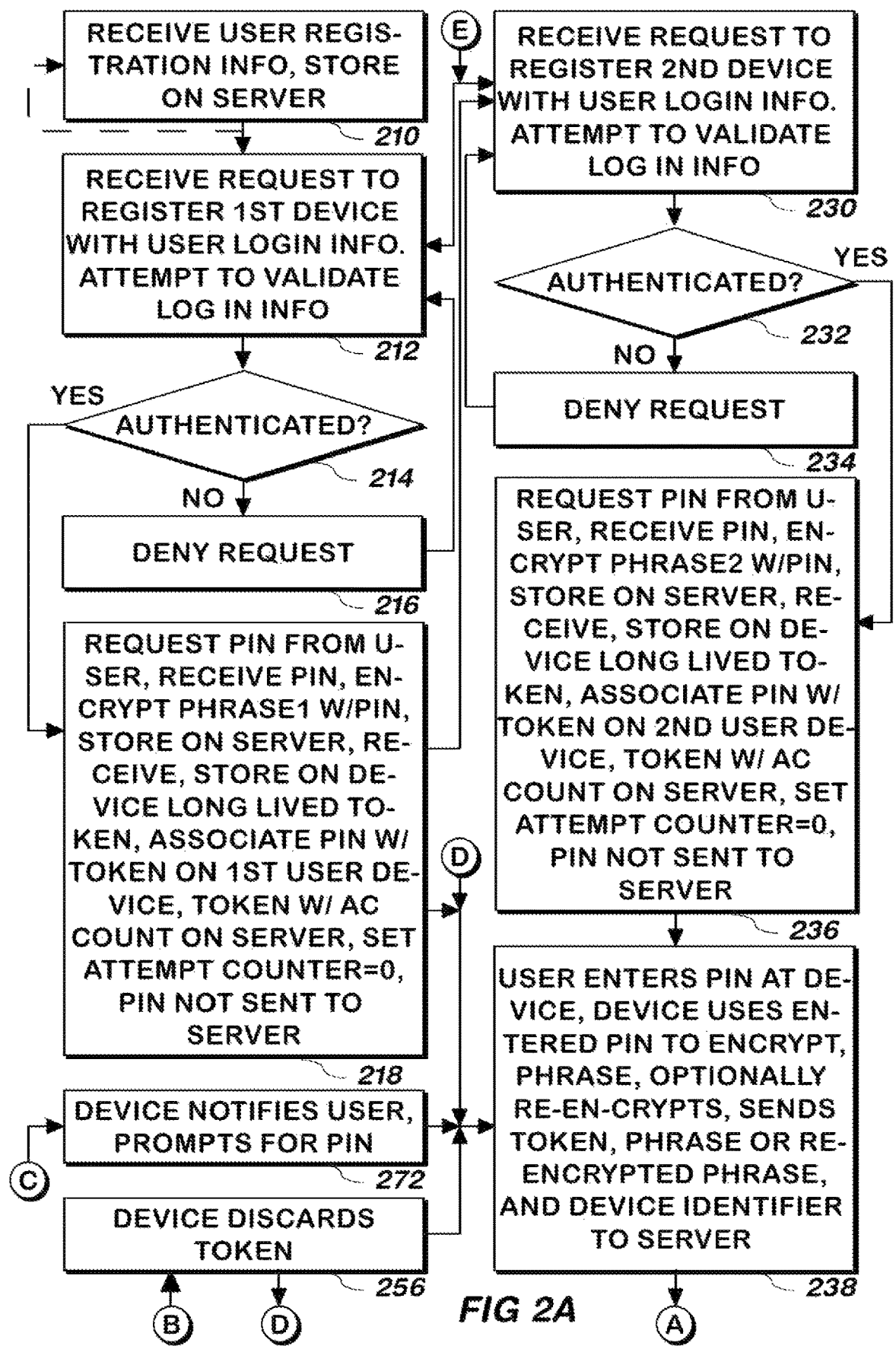
FIG. 2, consisting of FIGS. 2A and 2B, is a flowchart illustrating a method of providing access to functions performed by an application on a user device according to one embodiment of the present invention.
Figure 2B:
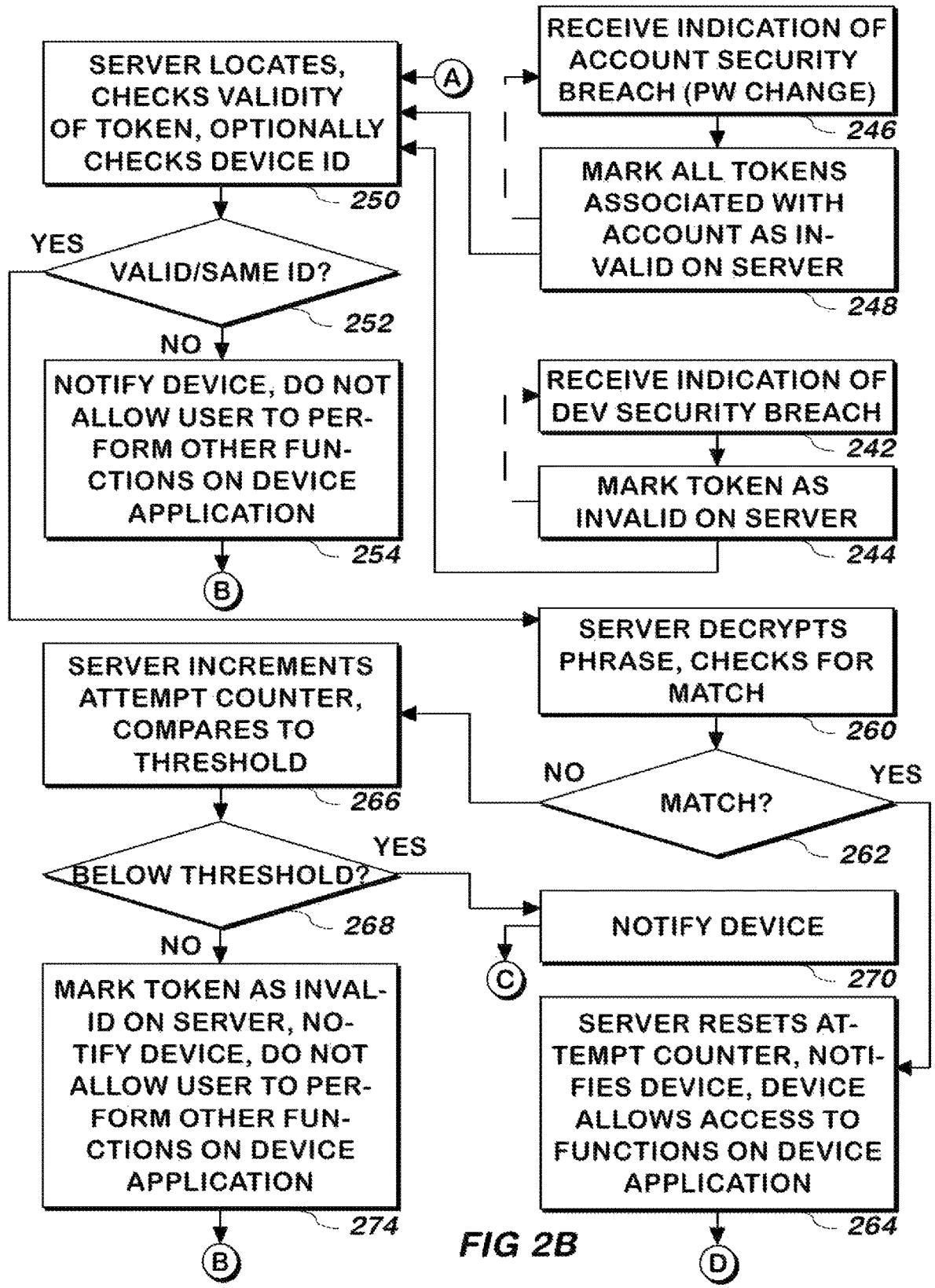

Referring now to FIG. 2, consisting of FIGS. 2A and 2B, a method of providing access to functions performed by an application on a user device according to one embodiment of the present invention.

Registration of an Account and One or More Tokens, PINs

User registration information for an account is received from a user, and stored on a server 210. User registration information may include conventional user registration information, such as a user identifier and a password. Any number of users may be registered at the server, as indicated by the dashed line of the Figure.

A request to register a first user device is received at the server from an application on the first user device, with account login information that was provided to the first user device by the user 212. The account login information may include the user's user identifier and password received as described above, or other conventional authentication information, such as a code that may be generated and provided to the user by the server. An attempt is made at the server or the application to validate the account login information using conventional techniques 212. Any conventional authentication technique may be used. (Authentication at the user device may be performed by the server hashing a known phrase with the user's previously-supplied user identifier and password and providing the result to the application on the user device, which performs the same hash with the user identifier and password received from the user and reports to the server if the results are the same, or the received user identifier and password are encrypted and provided to the server, which decrypts them and compares them to those stored. The server may only store a hash result of a known phrase using them and the server may authenticate by hashing as described above for the application.) If the account login information cannot be or is not authenticated 214, the request is denied 216 and the method continues at step 212.

If the account login information is authenticated 214 (if the server authenticates the account login information, the server so indicates to the application), the application on the first user device requests a PIN from the user, the PIN is received, used as an encryption or hash key to encrypt a phrase (which may be previously known by the application and the server or received from the server after such authentication, and stored by the application on the first user device), the encrypted phrase is encrypted and sent to a server, which decrypts it and stores it associated with the account whose login information was just validated, and the server deposits a unique token with a long life on the first user device and stores an unique identifier of the token on the server associated with the account whose login information was just validated, such identifier being part of the token 218. The token, or a portion of the token, or the identifier of the token, is associated with the account on the server corresponding to the account login information received 218. In one embodiment, the token is a conventional OAuth framework long-lived token, though other conventional tokens or similar authentication information may be used. In one embodiment, the token is deposited on the first user device by the server in response to the phrase encrypted or hashed with the PIN being received from the user (some or all communications between each device and the server may be encrypted). In one embodiment, a token is assumed valid unless invalidated as described herein, and thus the token deposited on the server is considered to be a valid token.

The method continues at step 230 or step 238.

A request to register a second user device is received at the server from the second user device, with account login information that was provided to the second user device by the user 230. The request is made by the same user using the same account information as was used above. An attempt is made at the server to validate the account login information using conventional techniques 230. If the account login information cannot be authenticated 232, the request is denied 234 and the method continues at step 230.

If the account login information is authenticated 232 (if the server authenticates the account login information, the server so indicates to the application), the application on the second user device requests a PIN from the user, the PIN is received, used as an encryption or hash key to encrypt a phrase (which may be the same or different from the phrase used above, but known by both the application and the server or supplied to the server as described above, and stored by the application on the second user device), the encrypted phrase is encrypted and sent to a server, which decrypts it and stores it associated with the account whose login information was just validated, and the server deposits a token (unique, i.e. different from, but similar to, the token received as described above) with a long life on the second user device and stores an identifier of the token on the server associated with the account whose login information was just validated, such identifier being part of the token 236. The token, or a portion of the token, or the identifier of the token, is associated with the account on the server corresponding to the account login information received 236. In one embodiment, the token is a conventional OAuth framework long-lived token, though other conventional tokens or similar authentication information may be used. In one embodiment, the token is deposited on the second user device by the server in response to the phrase encrypted or hashed with the PIN being received from the user received from the second user device (communications between each device and the server may also be encrypted). In one embodiment, a token is assumed valid unless invalidated as described herein, and thus the token deposited on the server is considered to be a valid token. The method continues at step 238.

In one embodiment, each PIN is user selectable, the PIN from the same user on two or more different devices may be the same or different, need not be unique to the user in the context of other users, may include a short sequence of characters or digits, and may be different from the password of the account. It is noted that the server does not receive any PIN nor is any PIN stored on the device in one embodiment. As part of steps 218 and 232, an attempt counter associated with the phrase encrypted with the PIN is cleared, or set to a value of zero.

Although two devices are described herein, the user may use 1 or 3 or any other number of user devices as described herein. Any number of users may use the present invention, but in one embodiment, the two user devices are both used by the same user. A user device may include a mobile device such as a smart phone or tablet, or may include any other type of computer.

In one embodiment, an operating system identifier that is unique to the user device is received from the user device with the optionally encrypted phrase and stored on the server associated with each token. Such device identifier may be retrieved from the operating system by the application on the user device that sends the encrypted, and optionally re-encrypted phrase, and sent together with such phrase.

Invalidation of Tokens.

In one embodiment, a token may be invalidated in two ways. The first way a token may be validated is a user device-level invalidation. A user device-level invalidation invalidates the token on a single user device. If an indication is received that that security has been breached on a user device on which a token has been deposited 242, the token corresponding to the user device is marked as invalid on the server 244 and the method continues at step 242 and step 250. The server invalidates the token using conventional token revocation techniques. The indication may be received at the server, with an identifier of the account and a name of the user device for which the security has been breached. In one embodiment, at steps 218 and/or 236, in addition to the PIN received from the user, the user also supplies, or the application retrieves from the device's operating system, a user-assigned or user device-assigned name of the user device being used to supply the PIN. Such name is provided to the server to the user device when the application on the user device supplies the phrase, and the server associates the user device name with the token as part of steps 218 and/or 236.

The second way token may be invalidated is an account-level invalidation, which invalidates all tokens associated with an account on the server. An indication of an account security breach may be received at the server 246. In one embodiment, an indication of an account security breach is received when the user changes his or her password for the account on the server. In response, all tokens associated with the account for which the indication was received of the security breach are invalidated on the server 248, and the method continues at step 246. The account is identified by the username and optionally, the password used to authenticate the user to the server.

If there are multiple applications referencing the same account on a user device, in one embodiment, when a token for one application of a user account is invalidated on a device, all tokens for the user device that were authenticated using the account are invalidated by the server.

Use of Tokens.

At step 238, the user may enter a PIN at the application on any user device in which a PIN has been registered as described herein. Such application receives the PIN and uses the received PIN to encrypt or otherwise hash the same phrase that was used by that device at step 218 or 236 in the same manner as the initial hash or other encryption. The result may be encrypted again as part of the encrypted communications sent to the server. The device sends the result, optionally re-encrypted, the token, and optionally, the device identifier, to the server. It is noted that the PIN itself is not sent to the server.

The server uses the identifier in the token it receives to locate the identifier of the user, and then checks the validity of the token 250. In the embodiment in which the device identifier is used, server additionally checks whether the device identifier received is stored associated with the token. If the token is valid, and optionally if the device identifier received matches the device identifier stored 252, the method continues at step 260. Otherwise 252, the application on the device from which the token was received is notified by the server that the authentication has failed, and the application on the device will not allow the user to perform some or all functions of the application 254. Such functions may be those that would ordinarily not be allowed to be performed without the user authenticating himself or herself using login information as described above if the PIN cannot be validated. The device optionally discards the token 256, and the method continues at step 212, 230 or 238.

At step 260, the server decrypts the phrase if it was optionally encrypted, and compares the phrase encrypted with the pin received from the user device with the phrase encrypted with the pin originally received from the user device and stored on the server to determine if the phrases match 260.

If the phrases match 262, the server resets the attempt counter to zero, and notifies the application on the device from which the phrase was received that the user has been authenticated, and such device allows access to the functions on the application of such device that would otherwise only be provided if the user authenticated himself or herself using the login information 264. The method continues at step 238, or step 230.

If the phrases did not match 262, the server increments the attempt counter corresponding to the token, and compares the attempt counter to a threshold 266. The attempt counter is initialized to zero when the token is issued as described above. If the attempt counter is below the threshold, the server notifies the device that phrase did not match 270, the device notifies the user that the PIN is incorrect, and prompts the user to reenter the user's PIN 272, and the method continues at step 238. If the attempt counter is not below the threshold 268, the token is marked as invalid on the server, the device is notified not to allow the user to perform the functions that would otherwise only be available if the user had authenticated himself or herself by providing login formation as described herein 274, and the method continues at step 256.

In one embodiment, the user can then only obtain such functions using the user device by authenticating himself or herself using login information and may reregister the same or different PIN on the device to obtain such functions via the PIN as described herein. The user may be notified as such by the application.

In one embodiment, the user may use all of the functions application without entering a PIN or registering a PIN if the user enters their username and password to the application, which forwards it to the server for authentication, and if authenticated, the server notifies the application, which allows the user to use it.

Thus, a user may register PINs at different user devices, invalidate a token on one user device, and use a different device to perform functions of an application, while being denied the use of an application from the user device corresponding to the token invalidated. The user may then register a PIN on an application on the user device corresponding to the invalidated token, and use the user device to perform functions on an application on that user device. In one embodiment, the user is not restricted from using the same or different PINs on multiple user devices or from reregistering the same PIN after an invalidation of the token for the PIN.

It is noted that, in one embodiment, use of a correct PIN alone (i.e. without the token) will not allow the user access to the server. The PIN by itself is not transmitted or used independently of the phrase or the token by the server to authenticate the user. It is also noted that the invalidation of the token does not occur on the user device, and the discarding of the token in step 256 is optional. It is also noted that the PIN itself is not invalidated when the server invalidates the token, and it could be reused in a subsequent registration on the same user device if the application so allows.

System

FIG. 3 illustrates a system 300 for providing access to features of an application on a user device according to one embodiment of the present invention. Referring now to FIG. 3, system 300 includes server 300, and multiple user devices 308 that multiple users and one or more system administrators use to communicate with server 300. A user may use one or more user devices, each with the same or different PIN registered as described herein 308, or some user devices 308 of the user may have the same PIN registered as described herein while other user devices 308 of that same user may have a different PIN registered as described herein. Each user device may include a conventional smart phone or tablet, smart watch or smart glasses, or other conventional computer system. Elements of a representative user device 308 are shown in FIG. 4 in more detail.

Referring now to FIGS. 3 and 4, communication interfaces 302, 402 each include a conventional communication interface, such as a TCP/IP-compatible communication interface using suitable communication protocols, such as TCP/IP, Ethernet, or both. Each includes inputs 301, 401 coupled to network 309, which may include networks that make up the Internet, Ethernet networks or both. All communication into or out of server 300 or user devices 308 is made via its respective communication interface 302, 402, unless otherwise noted.

Login/registration manager 310 provides a user interface to the user and receives from the user the user registration information described above, and stores such user information, including user identifier and password, in user information storage 304. The user may use a browser on user device 308 to provide such information to login/registration manager 310.

At any time, the user may use a user device 308 to register a PIN for use in accessing functions on application 400 of user device 308. To do so, the user uses PIN registration manager 412 which requests login information from the user and provides such login information to login/registration manager 310, which receives and authenticates the user's login information using the username and password stored in user information storage 304 using conventional techniques, and indicates to PIN registration manager 412 whether such login information was authenticated. If the login information was not authenticated, PIN registration manager 412 so indicates to the user, who may re-attempt to register a PIN as described herein. If the login information is authenticated, PIN registration manager 412 requests the PIN from the user and receives such PIN. The phrase may be generated by PIN registration manager, or PIN registration manager 412 may request and/or receive it from login/registration manager 310, which generates it, encrypts it using a public key of the device which PIN registration manager provides using conventional techniques, and the optionally encrypted version is provided by login/registration manager 310 to PIN registration manager 412 with the information that the login information was authenticated). PIN registration manager 412 stores the phrase, not encrypted with the user's PIN as described below, into phrase and token storage 408. The phrase could not be used by itself to authenticate the user.

PIN registration manager 412 encrypts the phrase using the PIN received from the user and provides it to login/registration manager 310, which provides it to token/registration manager 318 with the user identifier of the user who it authenticated as described above. The user's PIN is not stored anywhere, in one embodiment.

When it receives such information, token registration manager 318 issues a token using conventional techniques, stores the token into user information storage 304 associated with the user identifier it received, stores the encrypted phrase in user information storage 304 associated with the token, initializes to zero an attempt counter associated with the token in user information storage 304 and provides the token to PIN registration manager 412, which stores the token into phrase and token storage 408 (replacing any token for that user previously stored there by PIN registration manager 412).

Any number of one or more users may register any number of one or more user devices 308 in a manner similar or identical to that described above, as described herein.

In one embodiment, PIN registration manager 412 requests and receives a user device name from the user, optionally retrieving a default value for the user device name from the operating system of the user device 308 and presenting it to the user. The user may accept the default, or enter a new device name to override the default, and PIN registration manager 412 provides that user device name with the user identifier it provides to token registration manager 418 as described above, and such user device name is stored by token registration manager 318 into user information storage 304, associated with the token, if it authenticates the user identifier as described herein.

In one embodiment, PIN registration manager 412 requests and receives from the operating system (not shown) of the user device 308 a unique operating system-provided device identifier as described above, and provides such device identifier with the encrypted phrase to token registration manager 318, which stores it into user information storage 304, associated with the token, if it authenticates the user identifier and password.

At any time, the user may indicate that the security of the user device has been breached, and a system administrator receives the device name from the user, and provides it to single token invalidation manager 342, along with the user identifier of the user that the system administrator receives from the user. Single token invalidation manager 342 uses such information to locate the corresponding token in user information storage 304, and invalidates the token, using conventional token revocation techniques in user information storage 304.

In one embodiment, the user may log into the server using login/registration manager 310 by providing the user identifier and password for the user account on the server 300. The user may indicate that the account security may have been breached, for example by requesting to change the password associated with the account for the user identifier on server 300 via login/registration manager 310. Login/registration manager 310 provides the user identifier of the account on the server 300 to multi-token invalidation manager 346, which invalidates all tokens associated with the user identifier it receives in user information storage 304. The user may also perform such multi-token invalidation, by providing the account identifier to a system administrator, who provides it to multi-token invalidation manager 346, which invalidates all the tokens user information storage 304 that are associated with the account identifier it received. In one embodiment, the user may directly invalidate tokens for their account in the same manner as a system administrator, without involving a system administrator.

As noted above, tokens stored into user information storage 304 by token registration manager 318 are presumed valid unless invalidated as described above. When a token is invalidated, the encrypted phrase associated with such token is deleted from user information storage 304 by the system component that invalidated the token.

At any time, a user may access functions on application 400 by authenticating himself or herself via a user identifier and password, or a PIN. The functions provided by application 400 may be any conventional functions provided by an application, including those described above. In one embodiment, zero, one or more functions of an application on user device 308 may be provided with no authentication, zero, one or more other functions may be provided by the application on user device 308 via authentication by either the PIN for the device or the user's user identifier and password, while zero, one or more other functions may require a user identifier and password to be received from the user before the application on user device 308 will perform them.

To access such application functions, the user uses device login manager 438, which checks phrase and token storage 408 for a token, and if no token is stored, device login manager 438 prompts the user for his or her user identifier and password and logs the user in using conventional techniques, providing functionality if the user is logged in, and denying functionality if the user is unable to login.

If the token is stored in phrase and token storage 408, device login manager 438 prompts the user for the PIN for the device, receives the PIN, and encrypts the phrase stored in phrase and token storage 408 using the PIN received from the user as a hash or encryption key. Device login manager 438 provides the token, the encrypted phrase, and optionally the device identifier to token login manager 350 via network 309, and communication interface 402, and communication interface 302. Such information may be encrypted using conventional encryption techniques, such as a public and private key pair of the server, the public key of which device login manager 438 internally stores.

Token login manager 350 receives such information, optionally decrypts it using its private key, and provide such information to validity manager 360. When it receives such information, validity manager 360 locates the token in user information storage 304 and checks to see if the token is valid, and optionally whether or not it is associated in user information storage 304 with the same device identifier as the one received. If the token cannot be located in user information storage, or the token is invalid, or the device identifier received is not associated with the token in user information storage 304, validity manager 360 so indicates to device login manager 438, using the reverse path between the server 300 and the user device 308 described above. If it receives such an indication, device login manager 438 informs the user of an error, optionally discards the token from phrase and token storage 408, and allows the user to either login using the user identifier and password, or register a new PIN as described above. If it locates the token in user information storage 304, the token is valid, and optionally the device identifier received is associated with the token in user information storage 304, validity manager 360 provides the encrypted phrase and a pointer to the token in user information storage 304 to phrase manager 362.

When it receives the encrypted phrase and the pointer, phrase manager 362 compares the encrypted phrase it receives with the encrypted phrase associated with the token corresponding to the pointer it receives in user information storage 304. If such phrases match, phrase manager 362 resets to zero the attempt counter in user information storage 304, and notifies device login manager 438 that the user is authenticated. Device login manager 438 then provides access to functions of application 400 that are not otherwise provided to the user without authentication and must the user authenticates himself or herself using a PIN as described herein or the users user identifier and password.

If the phrases do not match, phrase manager 362 provides the pointer it received to attempt counter manager 364, which increments the attempt counter associated with the token corresponding to the pointer it receives in user information storage 304 and compares the attempt counter to a threshold it internally stores. If the attempt counter is below the threshold, attempt counter manager 364 notifies device login manager 438 that the PIN is invalid and should be re-requested. Device login manager 438 notifies the user that the PIN is invalid, and requests the user to enter the user's PIN, and the process described herein is repeated using the newly entered PIN. If the attempt counter is at the threshold, attempt counter manager 364 marks as invalid the token in user information storage 304 corresponding to the pointer it receives, and notifies device login manager 438 that the attempt failed and that the token is invalid. When it receives such notification, device login manager 438 discards from phrase and token storage 408 the token, does not provide access to the functions that would otherwise be provided if the user had authenticated himself or herself using the PIN or the user's user identifier and password, and allows the user to log in using the user identifier and password, and/or optionally register and then use a new PIN as described herein.

It is noted that the same user may register the same PIN or different PINS to one or more user devices 308 as described above. In one embodiment, the tokens on each user device may be unique, and may identify the user device.

Summary.

A method of authenticating a user to a server from a device is described, including: registering an account at the server using registration information; authenticating the user at the server using registration information provided from the device and the registration information; in response to the authenticating step indicating the user is authentic, requesting and receiving at the device a first code from the user; storing a phrase on the device; encrypting the phrase using the code at the device to produce a first encrypted phrase and providing the first encrypted phrase to the server; in response to receiving the encrypted phrase at the server, generating a unique token, storing the token on the server associated with the account, storing the first encrypted phrase on the server, associated with the token and the account and providing the token to the device; storing the token on the device; receiving a request from the user to log into the user's account from the device after the first encrypted phrase is provided to the server; checking for the token stored on the device in response to the request; in response to the token being stored on the device, requesting a second code from the user via the device; receiving the second code from the user at the device; encrypting the phrase using the second code to produce a second encrypted phrase and providing the second encrypted phrase and the token to the server; receiving the second encrypted phrase at the server, locating the first encrypted phrase responsive to the token received, and comparing the second encrypted phrase with the first encrypted phrase to determine whether they match; checking the validity of the token sent with the second encrypted phrase at the server to determine whether it is valid; in response to the token being determined valid and the second encrypted phrase matching the first encrypted phrase, and the token and the first encrypted phrase being associated with the account, providing an indication to the device; and in response to the indication, granting access to a function that is provided only if the user is authenticated The method may additionally include, in response to the second encrypted phrase not matching the first encrypted phrase, and having previously received at least one third encrypted phrase not matching the first encrypted phrase, invalidating the token and not granting access to the function that is provided only if the user is authenticated.

The method may include an optional feature whereby an other token for each of at least one other device is associated with the account; and none of the at least one other toke is invalidated when the token is invalidated The method may include an optional feature whereby an other token for each of at least one other device is associated with the account; and additionally may include invalidating the token and all of the at least one other token associated with the account substantially simultaneously, in response to an event.

The method may include an optional feature whereby the event comprises the user changing at least some of the registration information.

A system for authenticating a user to a server from a device is described, including: a login/registration manager for registering an account at the server using registration information; a PIN registration manager having an output for requesting from the user the registration information, for receiving the registration information from the user via an input and for providing the registration information via an output coupled to an input of the login/registration manager; wherein the login/registration manager is additionally for receiving the registration information at the login/registration manager input, for authenticating the user using the registration information received from the PIN registration manager and the registration information used to register the user and for providing at an output coupled to the PIN registration manager input a first indication in response to the login/registration manager detecting at least a correspondence between the registration information received from the PIN registration manager and the registration information used to register the user; wherein the PIN registration manager is additionally for receiving at the PIN registration manager input the first indication, and for, in response to the first indication indicating the at least the correspondence was detected, requesting at the PIN registration manager output a first code from the user, receiving the first code at the PIN registration manager input and for storing a phrase, encrypting the phrase using the code at the device to produce a first encrypted phrase and providing the first encrypted phrase and at least some of the registration information at the PIN registration manager output; a token registration manager having an input coupled to the PIN registration manager output for receiving the first encrypted phrase and the at least some of the registration information, generating a unique token, storing via an output the token associated with the account, using the at least some of the registration information, storing via the token registration manager output the first encrypted phrase, associated with the token and the account and providing via the token registration manager output the token; wherein the PIN registration manager input additionally coupled to the token registration manager output for receiving the token, the PIN registration manager additionally for storing the token on the device via the PIN registration manager output; a device login manager having an input for receiving a request from the user to log into the user's account from the device after the first encrypted phrase is provided to the server, the device login manager for checking via an input coupled to the PIN registration manager output for the token stored on the device in response to the request, and, in response to the token being stored on the device, requesting via an output a second code from the user, receiving the second code from the user at the device login manager input, encrypting the phrase using the second code to produce a second encrypted phrase and providing the second encrypted phrase and the token via an output; and a validity and phrase manager having an input coupled to the device login manager output for receiving the second encrypted phrase, locating the first encrypted phrase responsive to the token via an input/output, and checking via the validity and phrase manager input/output the validity of the token sent with the second encrypted phrase at the server to determine whether it is valid, for reading the first encrypted phrase via the validity and phrase manager input, for comparing the second encrypted phrase with the first encrypted phrase to determine whether they match, and in response to the token being determined valid and the second encrypted phrase matching the first encrypted phrase, providing an indication at the validity and phrase manager output; and wherein the device login manager input coupled to the validity and phrase manager input for receiving the indication, the device login manager for, in response to the indication, granting access to a function that is provided only if the user is authenticated via the device login manager output.

The system may include an optional feature whereby the validity and phrase manager, in response to the second encrypted phrase not matching the first encrypted phrase, and having previously received at least one third encrypted phrase not matching the first encrypted phrase, providing an indication of the token at the validity and phrase manager output; additionally may include an attempt counter manager having an input coupled to the validity and phrase manager output for receiving the indication of the token, the attempt counter manager for incrementing via an input/output an attempt counter corresponding to the token to which the indication of the token corresponds, and for providing a signal at an output and invalidating the token via the attempt counter manager input/output based on the attempt counter and a threshold; and may include an optional feature whereby the device login manager input is additionally coupled to the attempt counter manager output for receiving the signal, the device login manager additionally for not granting access to the function that is provided only if the user is authenticated in response to the signal.

The system may include an optional feature whereby an other token for each of at least one other device is associated with the account; and none of the at least one other token are invalidated when the token is invalidated The system may include an optional feature whereby an other token for each of at least one other device is associated with the account; and additionally may include a multi token invalidation manager having an input for receiving an identifier of the account and an indication that an event has occurred, the multi token invalidation manager is for invalidating via an input/output the token and all of the at least one other token substantially simultaneously, in response to the indication that the event has occurred.

The system may include an optional feature whereby the login registration manager input is additionally for receiving a change of at least some of the registration information, and the login/registration manager is additionally for providing the indication that the event has occurred in response to the change of at least some of the registration information.

A computer program product including a non-transitory computer useable medium having computer readable program code embodied therein for authenticating a user to a server from a device is described, the computer program product including computer readable program code devices configured to cause a computer system to register an account at the server using registration information; authenticate the user at the server using registration information provided from the device and the registration information; in response to the computer readable program code devices configured to cause the computer system to authenticate indicating the user is authentic, request and receive at the device a first code from the user; store a phrase on the device; encrypt the phrase using the code at the device to produce a first encrypted phrase and providing the first encrypted phrase to the server; in response to receiving the encrypted phrase at the server, generate a unique token, store the token on the server associated with the account, store the first encrypted phrase on the server, associated with the token and the account and provide the token to the device; store the token on the device; receive a request from the user to log into the user's account from the device after the first encrypted phrase is provided to the server; check for the token stored on the device in response to the request; in response to the token being stored on the device, request a second code from the user via the device; receive the second code from the user at the device; encrypt the phrase using the second code to produce a second encrypted phrase and providing the second encrypted phrase and the token to the server; receive the second encrypted phrase at the server, locating the first encrypted phrase responsive to the token received, and comparing the second encrypted phrase with the first encrypted phrase to determine whether they match; check the validity of the token sent with the second encrypted phrase at the server to determine whether it is valid; in response to the token being determined valid and the second encrypted phrase matching the first encrypted phrase, and the token and the first encrypted phrase being associated with the account, provide an indication to the device; and in response to the indication, granting access to a function that is provided only if the user is authenticated.

The computer program product may additionally include computer readable program code devices configured to cause the computer system to, in response to the second encrypted phrase not matching the first encrypted phrase, and having previously received at least one third encrypted phrase not matching the first encrypted phrase, invalidate the token and not grant access to the function that is provided only if the user is authenticated.

The computer program product may include an optional feature whereby an other token for each of at least one other device is associated with the account; and none of the at least one other toke is invalidated when the token is invalidated The computer program product may include an optional feature whereby an other token for each of at least one other device is associated with the account; and may additionally include computer readable program code devices configured to cause the computer system to invalidate the token and all of the at least one other token associated with the account substantially simultaneously, in response to an event.

The computer program product may include an optional feature whereby the event comprises the user changing at least some of the registration information.

What is claimed is:

1. A method of authenticating a user to a server from a device, comprising:
    registering an account at the server using a first set of registration information;
    authenticating the user at the server using a second set of registration information provided from the device and the first set of registration information;
    in response to the authenticating step indicating the user is authentic, requesting and receiving at the device a first code from the user;
    storing a phrase on the device;
    encrypting the phrase using the first code at the device to produce a first encrypted phrase and providing the first encrypted phrase to the server;
    in response to receiving the first encrypted phrase at the server, generating a token, storing the token on the server associated with the account, storing the first encrypted phrase on the server, associated with the token and the account and providing the token to the device;
    storing the token on the device;
    receiving a request from the user to log into the account from the device after the first encrypted phrase is provided to the server;
    checking for the token stored on the device in response to the request from the user to log into the account;
    in response to the token being stored on the device, requesting a second code from the user via the device;
    receiving the second code from the user at the device;
    encrypting the phrase using the second code to produce a second encrypted phrase and providing the second encrypted phrase and the token to the server;
    receiving the second encrypted phrase and the token at the server, locating the first encrypted phrase responsive to the token received, and comparing the second encrypted phrase with the first encrypted phrase to determine whether they match;
    checking at the server a validity of the token sent with the second encrypted phrase to determine whether the token is valid;
    in response to the token being determined valid and the second encrypted phrase matching the first encrypted phrase, and the token and the first encrypted phrase being associated with the account, granting access to a function that is provided only when the user is authenticated.

2. The method of claim 1:
    additionally comprising, in response to the second encrypted phrase not matching the first encrypted phrase, and having previously received at least one third encrypted phrase not matching the first encrypted phrase, invalidating the token and not granting access to the function that is provided only if the user is authenticated; and
    wherein:
    at least one other token for each of at least one other device is associated with the account; and
    none of the at least one other token is invalidated when the token is invalidated.

3. The method of claim 1:
    wherein at least one other token for each of at least one other device is associated with the account; and
    additionally comprising invalidating the token and all of the at least one other token associated with the account, in response to an event.

4. The method of claim 3, wherein the event comprises the user changing at least some of the first set of registration information.

5. A system for granting access to a function that is provided only when a user is authenticated, comprising:
    a login/registration manager comprising a hardware computer processor at a server and coupled to a first computer memory, the login/registration manager for registering an account at the server using a first set of registration information received via an input;
    a PIN registration manager comprising a hardware computer processor at a device and coupled to a second computer memory and having an output for requesting from the user a second set of registration information, for receiving the second set of registration information from the user via an input and for providing the second set registration information via the PIN registration manager output coupled to an input of the login/registration manager;
    wherein the login/registration manager is additionally for receiving the second set of registration information at the login/registration manager input, for authenticating the user using the at least the second set of registration information received from the PIN registration manager and the first set of registration information used to register the user and for providing at an output coupled to the PIN registration manager input a first indication in response to the login/registration manager detecting at least a correspondence between the second set of registration information received from the PIN registration manager and the first set of registration information used to register the user;
    wherein the PIN registration manager is additionally for receiving at the PIN registration manager input the first indication, and for, in response to the first indication indicating the at least the correspondence was detected, requesting at the PIN registration manager output a first code from the user, receiving the first code at the PIN registration manager input and for storing a phrase, encrypting the phrase using the first code at the device to produce a first encrypted phrase and providing the first encrypted phrase and at least some of the registration information at the PIN registration manager output;
    a token registration manager comprising the hardware computer processor at the server coupled to the first computer memory and having an input coupled to the PIN registration manager output for receiving the first encrypted phrase and the at least some of the registration information, for generating a token, storing via an output the token associated with the account, using the at least some of the registration information, storing via the token registration manager output the first encrypted phrase, associated with the token and the account and providing via the token registration manager output the token;
    wherein the PIN registration manager input is additionally coupled to the token registration manager output for receiving the token, the PIN registration manager additionally for storing the token on the device via the PIN registration manager output;

a device login manager comprising the hardware computer processor at the device coupled to the second computer memory and having an input for receiving a request from the user to log into the account from the device after the first encrypted phrase is stored, the device login manager for checking via the device login manager input coupled to the PIN registration manager output for the token stored on the device in response to the request from the user to log into the account, and, in response to the token being stored on the device, requesting via an output a second code from the user, receiving the second code from the user at the device login manager input, encrypting the phrase using the second code to produce a second encrypted phrase and providing the second encrypted phrase and the token via the device login manager output; and a validity and phrase manager comprising the hardware computer processor at the server coupled to the first computer memory and having an input coupled to the device login manager output for receiving the second encrypted phrase and the token, locating the first encrypted phrase responsive to the token via an input/output, and checking via the validity and phrase manager input/output a validity of the token at the server to determine whether the token is valid, for reading the first encrypted phrase via the validity and phrase manager input, for comparing the second encrypted phrase with the first encrypted phrase to determine whether they match, and in response to the token being determined valid and the second encrypted phrase matching the first encrypted phrase, providing a second indication at an output; and wherein the system, in response to the second indication provided, grants the access to the function that is provided only when the user is authenticated.

6. The system of claim 5:

wherein the validity and phrase manager, in response to the second encrypted phrase not matching the first encrypted phrase, and having previously received at least one third encrypted phrase not matching the first encrypted phrase, is additionally for providing an indication of the token at the validity and phrase manager output;

additionally comprising an attempt counter manager having an input coupled to the validity and phrase manager output for receiving the indication of the token, the attempt counter manager for incrementing via an input/output an attempt counter corresponding to the token to which the indication of the token corresponds, and for providing a signal at an output and invalidating the token via the attempt counter manager input/output based on the attempt counter and a threshold;

and wherein:

the device login manager input is additionally coupled to the attempt counter manager output for receiving the signal, the device login manager additionally for not granting access to the function that is provided only if the user is authenticated, in response to the signal;

an other token for each of at least one other device is associated with the account; and none of the at least one other token are invalidated when the token is invalidated.

7. The system of claim 5:

wherein an other token for each of at least one other device is associated with the account; and additionally comprising a multi token invalidation manager having an input for receiving an identifier of the account and an indication that an event has occurred, the multi token invalidation manager for invalidating via an input/output the token and all of the at least one other token, in response to the indication that the event has occurred.

8. The system of claim 7, wherein the login/registration manager input is additionally for receiving a change of at least some of the registration information, and the login/registration manager is additionally for providing the indication that the event has occurred in response to the change of the at least some of the first set of registration information.

9. A non-transitory computer useable medium having computer readable program code embodied therein for authenticating a user to a server from a device, comprising computer readable program code devices configured to cause a computer system to:

register an account at the server using a first set of registration information;

authenticate the user at the server using a second set of registration information provided from the device and the first set of registration information;

in response to the computer readable program code devices configured to cause the computer system to authenticate indicating the user is authentic, request and receive at the device a first code from the user;

store a phrase on the device;

encrypt the phrase using the first code at the device to produce a first encrypted phrase and providing the first encrypted phrase to the server;

in response to receiving the first encrypted phrase at the server, generate a token, store the token on the server associated with the account, store the first encrypted phrase on the server, associated with the token and the account and provide the token to the device;

store the token on the device;

receive a request from the user to log into the account from the device after the first encrypted phrase is provided to the server;

check for the token stored on the device in response to the request from the user to log into the account;

in response to the token being stored on the device, request a second code from the user via the device;

receive the second code from the user at the device;

encrypt the phrase using the second code to produce a second encrypted phrase and providing the second encrypted phrase and the token to the server;

receive the second encrypted phrase and the token at the server, locating the first encrypted phrase responsive to the token received, and comparing the second encrypted phrase with the first encrypted phrase to determine whether they match;

check at the server a validity of the token, sent with the second encrypted phrase to determine whether the token is valid;

in response to the token being determined valid and the second encrypted phrase matching the first encrypted phrase, and the token and the first encrypted phrase being associated with the account, granting access to a function that is provided only when the user is authenticated.

10. The non-transitory computer useable medium of claim 9:

additionally comprising computer readable program code devices configured to cause the computer system to, in response to the second encrypted phrase not matching the first encrypted phrase, and having previously received at least one third encrypted phrase not matching the first encrypted phrase, invalidate the token and not grant access to the function that is provided only if the user is authenticated; and wherein:

an other token for each of at least one other device is associated with the account; and none of the at least one other token is invalidated when the token is invalidated.

11. The non-transitory computer useable medium of claim 9:

wherein an other token for each of at least one other device is associated with the account; and additionally comprising computer readable program code devices configured to cause the computer system to invalidate the token and all of the at least one other token associated with the account, in response to an event.

12. The non-transitory computer useable medium of claim 11, wherein the event comprises the user changing at least some of the first set of registration information.

* * * * *